United States Patent [19]

Miller

[11] Patent Number: 4,517,847
[45] Date of Patent: May 21, 1985

[54] FLOWMETER HAVING UNIFORM RESPONSE UNDER BOTH LAMINAR AND TURBULENT FLOW CONDITIONS

[75] Inventor: Richard W. Miller, Foxboro, Mass.

[73] Assignee: The Foxboro Company, Foxboro, Mass.

[21] Appl. No.: 437,062

[22] Filed: Oct. 27, 1982

[51] Int. Cl.³ .............................. G01F 1/40; G01F 1/28
[52] U.S. Cl. ................................ 73/861.74; 73/861.52; 73/861.61
[58] Field of Search ............ 73/861.42, 861.52, 861.61, 73/861.63, 861.65, 861.71, 861.74, 861.75, 861.76; 138/44

[56] References Cited

U.S. PATENT DOCUMENTS

| | | | |
|---|---|---|---|
| 2,487,083 | 11/1949 | Warshaw | 73/861.61 |
| 3,759,098 | 9/1973 | Logsdon et al. | 73/861.52 |
| 4,186,599 | 2/1980 | Frick | 73/861.24 |
| 4,290,315 | 9/1981 | Groberg | 73/861.61 |

FOREIGN PATENT DOCUMENTS

| | | | |
|---|---|---|---|
| 626254 | 2/1936 | Fed. Rep. of Germany | 73/861.75 |
| 774392 | 1/1944 | Fed. Rep. of Germany | 73/861.74 |
| 1573038 | 5/1970 | Fed. Rep. of Germany | 73/861.52 |
| 1252433 | 11/1971 | United Kingdom | 73/861.74 |

Primary Examiner—Herbert Goldstein
Attorney, Agent, or Firm—Jack H. Wu; Terrence Martin

[57] ABSTRACT

A target flowmeter includes a target body with an aperture through its impact surface, to equalize the forces generated on the target under both laminar and turbulent fluid flow conditions, as well as in the transition region therebetween. In a particular embodiment, the target body has an annular shape and is centered about the pipe center line, the size of the aperture being such that the target is acted upon by only those portions of the laminar and turbulent flow profiles having substantially similar shapes. Since the annular body is unaffected by the high velocity peak of the parabolic laminar profile, the force versus velocity relationship in the laminar flow range is approximately the same as in the turbulent flow range. This results in a more consistently accurate flow velocity measurement across the two flow regimes. Specific dimensional relationships between the size of the aperture and that of the pipe serve to optimize these results.

5 Claims, 8 Drawing Figures

4,517,847

FLOWMETER HAVING UNIFORM RESPONSE UNDER BOTH LAMINAR AND TURBULENT FLOW CONDITIONS

BACKGROUND OF THE INVENTION

The present invention relates in general to the field of target flowmeters, and in particular to those having a uniform response over the transition between turbulent and laminar flow conditions.

Target flowmeters have long been used for the measurement of the rate of flow of liquids through a pipeline. They operate on the principle that the amount of force generated by onrushing fluid impacting on a target whose planar surface is oriented perpendicular to the direction of flow is proportional to the square of the flow velocity. The target typically is mounted on a pivotable balance beam to permit its deflection. However a force balance mechanism counteracts the movement of the balance beam and generates an output signal corresponding to the amount of force. This output signal in turn is correlated to a flow velocity measurement. Typical of such a conventional target flowmeter is the Model 13T Target Flow Transmitter manufactured by The Foxboro Company, Foxboro, Mass.

Although the target flowmeter has shown to be capable of acceptable accuracy in the region of turbulent fluid flow (i.e., pipe Reynolds numbers $R_D$ greater than 4,000) a noticeable dropoff in the accuracy occurs once the fluid flow has moved down into the laminar-to-turbulent flow transition region (i.e., pipe Reynolds numbers in the range 2,000–4,000). In the past, if a target flowmeter was to be used over both these ranges of fluid flow conditions, then some sort of compensation was required to insure accurate overall performance. Often "disturbing plates" were used to flatten out the laminar flow profile prior to impact with the target, to approximate the turbulent flow profile. However, such an approach produces an undesirable permanent decrease in the flow coefficient.

Also, the compensation schemes, whether mechanical or electronic in nature, often unduly complicated the flowmeter structure, thereby increasing its cost while adversely affecting its reliability and efficiency.

With this in mind, it is an object of the present invention to provide an improved target flowmeter by employing a target body having a more uniform response to flow regardless of the flow regime in which it is operating. It is a further object of the present invention to accomplish the above with a minimum of modification to an existing target flowmeter, to permit retrofitting thereof.

It is yet a further object of the present invention to achieve a target flowmeter having the above characteristics which is usable in a variety of fluids, including liquids, multi-component fluids, and non-Newtonian fluids.

SUMMARY OF THE INVENTION

The present invention operates within the context of a fluid flowmeter of the type in which a fluid stream within a conduit exerts a force on a target body centrally positioned within the conduit, the force being related to the differential pressure created by said target body and proportional to the square of the velocity of the fluid stream, and having a mechanism for correlating that force to the fluid velocity. An embodiment of the invention includes a means for reducing the variations in the force exerted on the target body by the fluid stream over the laminar-to-turbulent flow regime. By this means the accuracy of the force-to-fluid-velocity correlation is enhanced.

In a particular embodiment of the invention, this reducing of the variation is achieved by introducing an aperture into the target, centrally positioned within the target and extending entirely through the target in the flow direction. Placing the aperture so as to coincide with that portion of the laminar flow profile which is significantly different from the turbulent flow profile results in the target interacting with a flow profile which is more or less uniform regardless of the flow conditions in which it is operating. In other words the only portions of the target flowmeter surface which are left to be impacted by the flow stream will experience the same amount of impact whether in a laminar or turbulent flow situation.

Experimentation has shown that certain dimensional relationships exist between the aperture size and the flow conduit diameter which optimize the balancing effect.

BRIEF DESCRIPTION OF THE DRAWINGS

The numerous operating features and advantages of the present invention will be made clear by the following detailed description, in conjunction with the following drawings in which.

DESCRIPTION OF THE PREFERRED EMBODIMENTS

Figure 1:
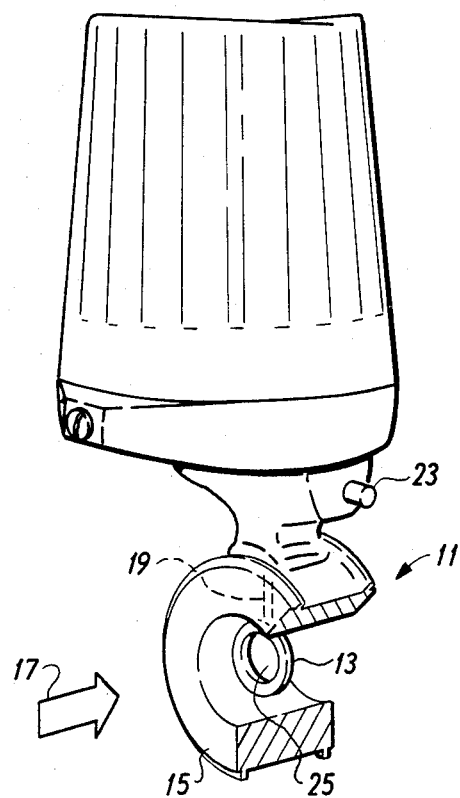
FIG. 1 is a perspective view, in cutaway, of a modified body target flowmeter in accordance with the present invention.

In FIG. 1, an improved target flowmeter 11 in accordance with the present invention has a target 13 positioned centrally within a pipe 15 conveying a stream of fluid in the direction indicated by an arrow 17. Consistent with the construction of a conventional target flowmeter, the target is positioned symmetrically about the conduit center line, and traverses a substantial portion of the cross-section of the pipe. The flow obstruction caused by the target creates a differential pressure on opposite sides thereof, resulting in a net force being applied to the front surface of the target, the magnitude of the force being proportional to the average magnitude of the fluid flow velocity squared.

The target 13 is rigidly attached to a slender balance beam 19 which extends radially away from the center line of the pipe 15 and passes through the pipe wall into engagement with a conventional force balance mechanism (not shown), housed within a topworks assembly 21. Such a force balance mechanism is well known in the flowmeter art, and therefore its structural details will not be discussed in any further detail herein. The balance beam is pivotally mounted with respect to the pipe, to permit deflection thereof in response to the force impacting on the front surface of the target. However, the operation of the force balance mechanism keeps this deflection to a microscopic scale, and in so doing, develops an output signal, either electric or pneumatic, whose magnitude is proportional to the force on the target. This output signal is available on output port 23 for transmission to appropriate signal processing circuitry (not shown). Since this output signal also is proportional to the square of the fluid flow rate, it can be easily converted by the circuitry to give an indication of flow rate.

Figure 3:
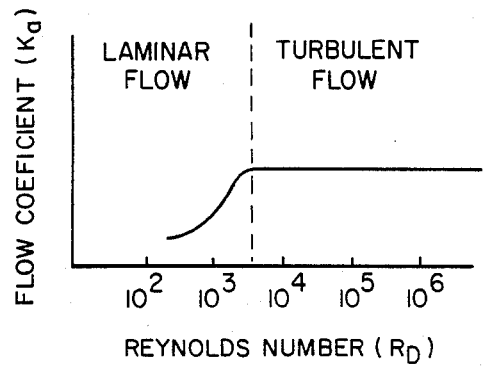
FIG. 3 is a graph depicting the meter flow coefficient versus pipe Reynolds number relationship, over the laminar and turbulent flow regions, using the target of FIGS. 2A and 2B.
Figure 2A:
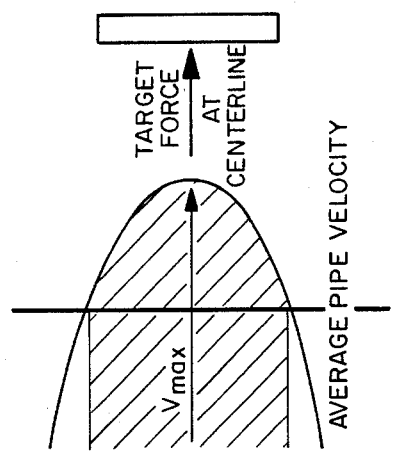
FIGS. 2A and 2B are diagrams showing the interaction of a prior art target body with the laminar and turbulent flow profiles respectively.
Figure 2B:
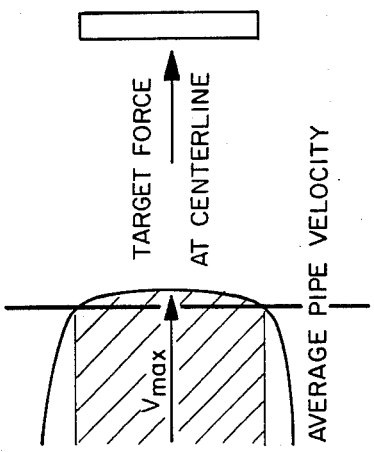

It is apparent that in the case of a conventional target which presents a solid barrier to the fluid flow, its front surface is acted upon by velocity components from essentially all points within the flow stream. Referring now to FIGS. 2A and 2B, the relationships between a conventional target shape 25 and the laminar and turbulent flow profiles are depicted. In the case of the turbulent flow profile (FIG. 2B), the target is subjected to a generally constant amount of force at each point on its surface. However, in the case of the laminar flow profile (FIG. 2A) a substantially higher range of velocities is present in the region about the center line of the pipe. Thus, the average amount of force being exerted on the target by the action of the laminar flow stream is skewed by the disproportionate center section of the profile. As shown in FIG. 3, the flow coefficients of the target flowmeter within the turbulent flow region ($R_D > 4,000$) are constant within about ±2%. But, at the transition to the laminar flow region, there is a significant dropoff, and the flow coefficients are biased by up to 20%.

Figure 4A:
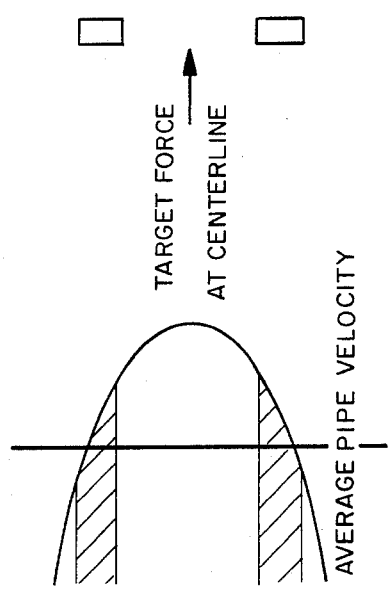
FIGS. 4A and 4B are diagrams showing the interaction of a target body in accordance with the present invention with the laminar and turbulent flow profiles respectively.
Figure 4B:
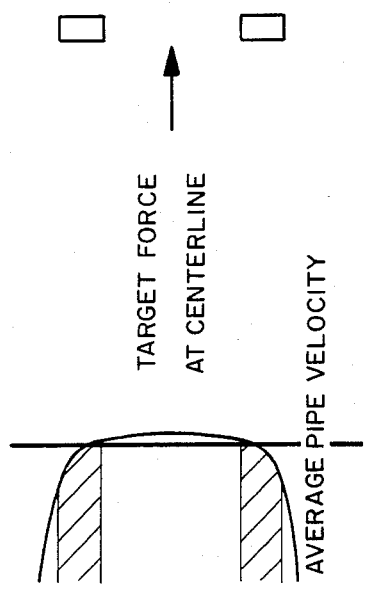

In the present invention, removal of a portion of the target impact surface lessens the effect of these drastic differences in the two flow profiles. By judicious placement of a circular aperture 25 within the previously solid surface of the target, those portions of the target which physically coincide with the significantly dissimilar regions of the flow profiles are eliminated. As shown in FIGS. 4A and 4B, the resulting annular shape (see FIG. 1) causes the target to be subjected to only those portions of the profiles which are more or less the same in both the laminar and turbulent conditions. The mean radius of the integrated flow profile momentum striking the target is located at the same mean radius for both the laminar and the fully developed turbulent profiles. In simplest terms, the target cannot tell the difference between the two profiles.

Figure 5:
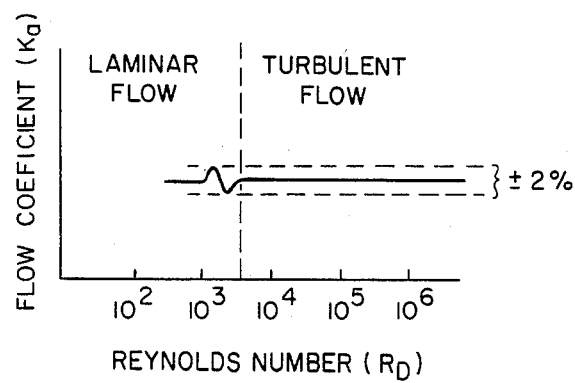
FIG. 5 is a graph depicting the meter flow coefficient versus pipe Reynolds number relationship achievable with the improved target body of FIGS. 4A and 4B.

Although it has been established that arbitrary placement of the aperture within the target body will produce improvements in the constancy of the flow coefficients over the transition region and into the laminar region, nevertheless there are certain considerations which will optimize this effect. Experimentation has shown that if the ratio of the aperture diameter divided by the inside pipe diameter, $\beta_i$ is maintained within the range $0.25 \leq \beta_i \leq 0.55$ and if the ratio of the outer target diameter divided by the inside pipe diameter, $\beta_o$ is maintained in the range $0.65 \leq \beta_o \leq 0.90$, then the relationship between the flow rate and the target force obeys the aforementioned squared function to within ±2%, even well into the laminar flow region. These improved performance results are evidenced by the flow coefficient versus Reynolds number curve shown in FIG. 5, which results from the introduction of the modified target shape.

It should be noted that certain other physical modifications can achieve additional performance enhancements to varying degrees, depending on, for example, the size of the pipe within which the target is installed. Such modifications include rounding or tapering the inner and outer frontal edges of the target, or tapering the aperture so that from front to back it has a more or less conic shape. Also, a shroud or shield, fixed to the pipe well symmetrically about the pipe center line, and positioned so as to keep the fluid from impacting directly on the balance beam 19 (see FIG. 1) prevents the flow rate measurement from being adversely affected by extraneous forces exerted on the beam by the fluid.

Figure 6:
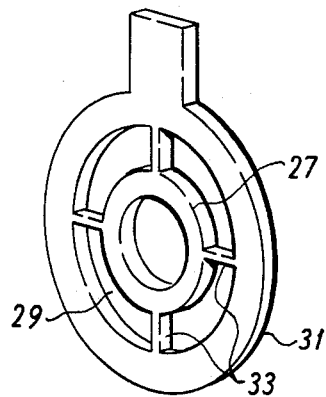
FIG. 6 is a perspective view of an alternative embodiment of the present invention.

Although the present invention has been described so far in the context of a target flowmeter, its operating principle also can be applied to existing orifice plate installations, so as to maintain the advantages of an orifice plate, e.g., its narrow profile. In a traditional orifice plate, a precision machined and carefully dimensioned hole is made within an otherwise solid plate, which completely spans the pipe interior. In accordance with the present invention, however (see FIG. 6), a narrow profile annular target 27 is positioned within a larger hole 29 in a thin orifice plate 31, the target being coplanar with the orifice plate and held in place by a series of narrow struts 33. The dimensional requirements as mentioned above in relation to the target meter are equally applicable in this alternate embodiment. Although the force generated by the fluid in impacting the annular target does not produce movement thereof, as it would in the case of the target meter, nevertheless a differential pressure is produced on either side of the orifice plate. This differential pressure can be measured using conventional orifice taps, in a manner well known to those skilled in the art. The differential pressure is similarly correlatable to a flow rate measurement, in accordance with the same principles as discussed above with relation to the target flowmeter.

Although the present invention has been described in terms of the preferred embodiments shown in the accompanying figures, certain modifications and changes will become apparent to those skilled in the art. Nevertheless it is intended that such modifications be encompassed within the scope of the following appended claims.

What is claimed is:

1. An improved fluid flowmeter of the type in which a fluid stream within a conduit exerts a force on a target body centrally positioned within said conduit, said force being related to the differential pressure created by said target body and proportional to the square of the velocity of said fluid stream, and having means for corelating said force to a measurement of said velocity, wherein said improvement comprises:
   target body means, having an aperture extending completely through said target body in the direction of fluid flow, for subjecting said target body to only those portions of laminar and turbulent flow profiles which are substantially identical, whereby said flowmeter responds uniformly under both laminar and turbulent flow conditions.

2. The improved fluid flowmeter as set forth in claim 1, wherein said aperture is positioned symmetrically about the center line of said conduit, the dimensions of said aperture being such that the high velocity components of the laminar flow profile which are not present in the turbulent flow profile pass through said aperture without impacting on said target body.

3. The improved fluid flowmeter as set forth in claim 2, wherein said target body and said aperture are circular, and wherein the ratio of the diameter of said aperture to the inner diameter of said conduit is in the range from about 0.25 to about 0.55, and the ratio of the outer diameter of said target body to the inner diameter of said conduit is in the range from about 0.65 to about 0.90.

4. Apparatus for measuring the flow rate of a fluid through a conduit, comprising:
 (a) a thin orifice plate positioned within said conduit, the planar surface of said thin orifice plate being perpendicular to the direction of fluid flow and having a central aperture about the center line of said conduit; and
 (b) an annular target body fixedly positioned within said central aperture, coplanar with said orifice plate and symmetric about said center line, wherein the inner diameter of said annular target body is such that the high velocity components of a laminar flow profile which are not present in a turbulent flow profile pass through said aperture without impacting on said annular target body.

5. Apparatus as in claim 4, wherein the ratio of the inner diameter of said annular target body to the inner diameter of said conduit is in the range from about 0.25 to about 0.55, and the ratio of the outer diameter of said annular target body to the inner diameter of said conduit is in the range from about 0.65 to about 0.90.

* * * * *